(12) United States Patent
Chuang

(10) Patent No.: US 6,512,725 B2
(45) Date of Patent: Jan. 28, 2003

(54) METHOD FOR CONTROLLING SPEED OF AN OPTIC DISK DRIVE

(75) Inventor: Sheng Hsu Chuang, Taipei (TW)

(73) Assignee: Lite-On It Corporation, Taipei (TW)

(*) Notice: Subject to any disclaimer, the term of this patent is extended or adjusted under 35 U.S.C. 154(b) by 82 days.

(21) Appl. No.: 09/847,419

(22) Filed: May 3, 2001

(65) Prior Publication Data
US 2002/0048245 A1 Apr. 25, 2002

(30) Foreign Application Priority Data
Oct. 20, 2000 (TW) .................................... 89122145 A

(51) Int. Cl.[7] ................................................ G11B 7/00
(52) U.S. Cl. .................................. 369/53.37; 369/47.39
(58) Field of Search ............................ 369/47.1, 47.36, 369/47.39, 53.1, 53.37, 59.1

(56) References Cited

U.S. PATENT DOCUMENTS 4,736,263 A * 4/1988 Takahashi et al. ............ 360/69

* cited by examiner

Primary Examiner—Muhammad Edun
(74) Attorney, Agent, or Firm—Rosenberg, Klein & Lee

(57) ABSTRACT

A method for controlling the speed of an optic disk drive comprising the steps of presetting a transmission speed of an optic disk drive to a lower value, and resetting a timer; pressing a retract button of the optic disk drive continuously, and then the timer beginning to count; a timer counting through a preset time period (at least five seconds), and the optic disk drive switching to a high transmission speed-mode; and pressing the retract button continuously, while the counting of the timer is not over the preset value, retracting an optic disk, and returning to a low transmission speed-mode.

2 Claims, 1 Drawing Sheet

METHOD FOR CONTROLLING SPEED OF AN OPTIC DISK DRIVE

FIELD OF THE INVENTION

The present invention relates to a method for controlling the speed of an optic disk drive, and especially to a method in which the transmission speed of an optic disk drive is selectable personally so that the user may adjust the transmission speed as desired and thus, the noise, vibration and power consumption from using an optic disk drive with high transmission speed is reduced. Thus, the optic disk drive can operate in two transmission speed modes. One is for high performance transmission speed. Another is for power saving and noise reduction.

BACKGROUND OF THE INVENTION

In general, as an optic disk drive is rotated in a high transmission speed, a large eccentric force will induce and thus, a large vibration in the mechanical structure of the optic disk drive occurs. This not only generates a noise, but also consumes larger power.

Therefore, it can be appreciated that the prior art optic disk drive has a fixed transmission speed and therefore, some defects induced which is necessary to be improved.

SUMMARY OF THE INVENTION

Accordingly, the present invention is to provide a method for controlling the speed of an optic disk drive, in which the transmission speed of an optic disk drive is selectable personally so that the user may adjust the transmission speed as desired and thus, the noise, vibration, power consumption, and transmission speed from using an optic disk drive can be optimized.

To achieve above object, the present invention provide a method for controlling the speed of an optic disk drive comprising the steps of presetting a transmission speed of an optic disk drive to a lower value, and resetting a timer; pressing a retract button of the optic disk drive continuously, and then the timer beginning to count; a timer counting to a preset time through a preset time period (at least five seconds), and the optic disk drive switching to a highspeed mode; and pressing the retract button continuously, while the counting of the timer is not over the preset value, retracting an optic disk, and returning to a low speed mode.

The various objects and advantages of the present invention will be more readily understood from the following detailed description when read in conjunction with the appended drawing.

DETAILED DESCRIPTION OF THE PREFERRED EMBODIMENTS

Figure 1:
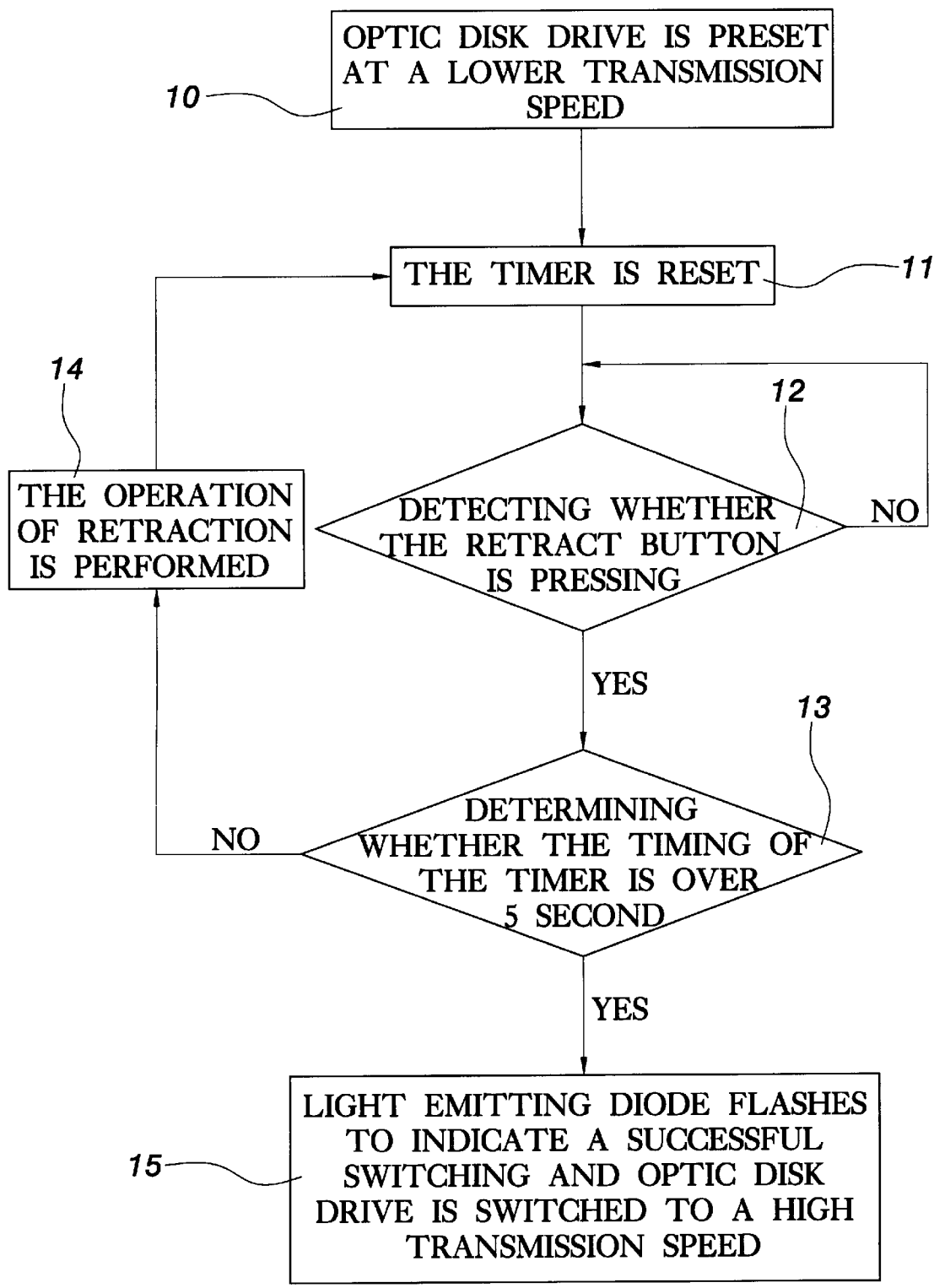
FIG. 1 is a flow diagram illustrating the operation of the present invention.

The details of the present invention will be described in the following with appended figures, those skilled in the art can understand the present invention from this described. However, the embodiments and the appended figures are only an example of the present invention but not for confining the scope of the present invention. The scope and spirit of the present invention are defined in the appended claims.

Referring to FIG. 1, the flow diagram of the present invention is illustrated. In the method for controlling the speed of an optic disk drive of the present invention, a control chip is installed within the optic disk drive. The condition of the retract button is detected every 10 ms. Assume if the retract button is not pressed, the signal is high, and if the retract button is pressed, the signal is low. At first, the optic disk drive is preset at a lower transmission speed mode (step 10). Then, the timer is reset (step 11) and detects whether the retract button is pressing (step 12)?

If not, the process return to (step 12), otherwise, the retract button outputs a low signal to the control chip for actuating the time to count and determines whether the timing of the timer is over 5 second (step 13)?

If not, it is considered that the retract button is pressed as in the prior art, then the operation of retraction is performed (step 14), and then returns to step 11.

Otherwise, the control chip enables the light emitting diode (LED) so that the light emitting diode flashes to indicate a successful switching and the optic disk drive is switched to a high transmission speed mode (step 15), i.e., the maximum transmission speed of the optic disk drive. As the user presses the retract button as in a conventional way, the optic disk drive performs the operation retraction and returns to the original low transmission speedmode.

Therefore, the method for controlling the speed of an optic disk drive has following advantages:

1. The optic disk drive is preset in a low transmission speedmode, the noise, vibration and high power consumption in high transmission speed mode is prevented.

2. After it is switched to a high transmission speed mode and is desired to return to a lower transmission speedmode, it is only necessary to press the retract button as in the prior art.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for controlling a speed of an optic disk drive comprising the steps of:

(a) presetting a transmission speed mode of an optic disk drive to a lower value, and resetting a timer;

(b) pressing a retract button of the optic disk drive continuously, and then the timer beginning to count;

(c) a timer counting through a preset time period, and the optic disk drive switching to a high transmission speedmode; and (d) pressing the retract button continuously, while the counting of the timer is not over the preset value, retracting an optic disk, and returning to a low transmission speed times.

2. The method for controlling the speed of an optic disk drive as claimed in claim 1, wherein the preset time period is at least five second.

* * * * *